US011244502B2

(12) United States Patent
Krs et al.

(10) Patent No.: US 11,244,502 B2
(45) Date of Patent: Feb. 8, 2022

(54) GENERATING 3D STRUCTURES USING GENETIC PROGRAMMING TO SATISFY FUNCTIONAL AND GEOMETRIC CONSTRAINTS

(71) Applicant: Adobe Inc., San Jose, CA (US)

(72) Inventors: Vojtěch Krs, West Lafayette, IN (US); Radomir Mech, Mountain View, CA (US); Nathan A. Carr, San Jose, CA (US)

(73) Assignee: Adobe Inc., San Jose, CA (US)

( * ) Notice: Subject to any disclaimer, the term of this patent is extended or adjusted under 35 U.S.C. 154(b) by 1036 days.

(21) Appl. No.: 15/825,959

(22) Filed: Nov. 29, 2017

(65) Prior Publication Data

US 2019/0164342 A1 May 30, 2019

(51) Int. Cl.
*G06T 17/20* (2006.01)
*G06T 17/10* (2006.01)

(52) U.S. Cl.
CPC .............. *G06T 17/20* (2013.01); *G06T 17/10* (2013.01)

(58) Field of Classification Search
CPC .......... G06T 17/20; G06T 17/10; G06T 17/00
USPC .......................................................... 706/13
See application file for complete search history.

(56) References Cited

U.S. PATENT DOCUMENTS

| 6,898,560 | B1 * | 5/2005 | Das | G06F 30/00 |
| | | | | 703/7 |
| 7,639,267 | B1 * | 12/2009 | Desimone | G06T 15/00 |
| | | | | 345/619 |
| 8,248,407 | B2 * | 8/2012 | Deslandes | G06F 30/17 |
| | | | | 345/420 |
| 10,013,467 | B1 * | 7/2018 | Brogle | G16C 20/80 |
| 10,409,921 | B2 * | 9/2019 | Rameau | G06F 30/00 |

(Continued)

FOREIGN PATENT DOCUMENTS

CN 104183008 B 1/2017

OTHER PUBLICATIONS

Jacob C., "Genetic L-System Programming", Parallel Problem Solving from Nature, Lecture Notes in Computer Science, Springer Berlin Heidelberg, 1994, vol. 866, pp. 333-343. (Year: 1994).*

(Continued)

*Primary Examiner* — Iftekhar A Khan
(74) *Attorney, Agent, or Firm* — Finch & Maloney PLLC

(57) ABSTRACT

Techniques are disclosed for generation of 3D structures. A methodology implementing the techniques according to an embodiment includes initializing systems configured to provide rules that specify edge connections between vertices and parametric properties of the vertices. The rules are applied to an initial set of vertices to generate 3D graphs for each of these vertex-rule-graph (VRG) systems. The initial set of vertices is associated with provided interaction surfaces of a 3D model. Skeleton geometries are generated for the 3D graphs, and an associated objective function is calculated. The objective function is configured to evaluate the fitness of the skeleton geometries based on given geometric and functional constraints. A 3D structure is generated through an iterative application of genetic programming techniques applied to the VRG systems to minimize the objective function. Receiving updated constraints and interaction surfaces, for incorporation in the iterative process.

20 Claims, 8 Drawing Sheets

(56) References Cited

U.S. PATENT DOCUMENTS

| | | | |
|---|---|---|---|
| 2004/0177139 A1* | 9/2004 | Schuba | H04L 67/322 709/223 |
| 2008/0172208 A1* | 7/2008 | Lechine | G06F 30/00 703/1 |
| 2013/0013549 A1* | 1/2013 | Chang | G06Q 50/01 706/48 |
| 2013/0346294 A1* | 12/2013 | Faith | G06F 21/552 705/39 |
| 2014/0324204 A1* | 10/2014 | Vidimce | B29C 64/386 700/98 |
| 2014/0358496 A1* | 12/2014 | Rameau | G06F 30/00 703/1 |
| 2015/0019471 A1* | 1/2015 | Hu | G06N 5/04 706/47 |
| 2015/0154262 A1* | 6/2015 | Yang | G06F 16/273 707/649 |
| 2015/0269286 A1* | 9/2015 | Rameau | G06F 30/00 703/1 |
| 2016/0093111 A1* | 3/2016 | Piche | G06T 17/10 345/419 |
| 2016/0093114 A1* | 3/2016 | Piche | G06T 15/30 345/420 |
| 2016/0148433 A1* | 5/2016 | Petrovskaya | G02B 27/01 345/633 |
| 2016/0171765 A1* | 6/2016 | Mehr | G06F 17/18 345/419 |
| 2016/0224694 A1* | 8/2016 | Boussuge | G06F 30/00 |
| 2017/0160726 A1* | 6/2017 | Rameau | G06T 17/005 |
| 2017/0312634 A1* | 11/2017 | Ledoux | G06T 15/005 |
| 2018/0122137 A1* | 5/2018 | Tian | G06K 9/00214 |
| 2019/0213773 A1* | 7/2019 | Lee | G06K 9/00248 |

OTHER PUBLICATIONS

Bergen S. and B.J. Ross, "Aesthetic 3D Model Evolution", Springer, Genetic Programming and Evolvable Machines, Apr. 18, 2013, 29 pages.

Haubenwallner K. et al., "Shapegenetics: Using Genetic Algorithms for Procedural Modeling", Computer Graphics Forum, May 2017, vol. 36, pp. 213-223.

Jacob C., "Genetic L-System Programming: Breeding and Evolving Artificial Flowers with Mathematica", In IMS95—First International Mathematica Symposium, Southampton, UK, 1995, Computational Mechanics Pub., 8 pages.

McDermott J., "Graph Grammars as a Representation for Interactive Evolutionary 3D Design", Evolutionary and Biologically Inspired Music, Sound, Art and Design, Lecture Notes in Computer Science, Springer Berlin Heidelberg, 2012, vol. 7247, pp. 199-210.

Sims K., "Evolving 3D Morphology and Behavior by Competition", Artificial Life IV Proceedings, MIT Press, 1994, pp. 28-39.

Xu K. et al., "Fit and Diverse: Set Evolution for Inspiring 3D Shape Galleries", ACM Trans. Graph., Jul. 2012, vol. 31, 10 pages.

Boechat, P. et al., "Representing and Scheduling Procedural Generation using Operator Graphs", ACM Trans. Graph, Nov. 2016, vol. 6, 12 pages.

Boechat, P. et al., "Representing and Scheduling Procedural Generation using Operator Graphs", ACM Trans. Graph., Nov. 2016, vol. 35, 12 pages.

Haubenwallner, K. et al., "ShapeGenetics: Using Genetic Algorithms for Procedural Modeling", Computer Graphics Forum, 2017, vol. 36, 11 pages.

McDermott, James, "Graph Grammars as a Representation for Interactive Evolutionary 3D Design", Springer-Verlag Berlin Heidelberg, 2012, pp. 199-210.

Office Action received in Australia Patent Application 2018226401, dated Oct. 1, 2021 (8 pages).

Ebner Marc et al., "Evolution of Vertex and Pixel Shaders", In Proceedings of 8th European Conference, EuroGP 2005, Lausanne, Switzerland (Mar. 30-Apr. 1, 2005), Lecture Notes in Computer Science, vol. 3447. Springer, Berlin, Heidelberg. DOI: https://doi.org/10.1007/978-3-540-31989-4_23, 10 pages.

Quiroz J. C. et al., "Interactive Shape Perturbation", arXiv preprint arXiv: 1706.04077 (Jun. 12, 2017). URL: https://arxiv.org/abs/1706.04077, 8 pages.

* cited by examiner

Rule Graph
410

Expansion
420

GENERATING 3D STRUCTURES USING GENETIC PROGRAMMING TO SATISFY FUNCTIONAL AND GEOMETRIC CONSTRAINTS

FIELD OF THE DISCLOSURE

This disclosure relates to techniques for generation of 3-dimensional (3D) virtual structures, and more particularly, to techniques for generating 3D virtual structures using genetic programming applied to graph-based procedural models to satisfy functional and geometric constraints.

BACKGROUND

The modelling of 3D objects is typically a difficult and time-consuming task that often requires artistic capability along with a high level of knowledge and expertise with specialized tools. As such, the generation of 3D models generally tends to be expensive. Some computer-based 3D modelling systems exist, but these systems are also generally difficult to use due to the large number of complex parameters and rules that need to be supplied and fine-tuned for a given task. Additionally, many of these computer-based systems require large quantities of data for training which can be inconvenient and impractical in some situations, and even when trained, performance is not particularly good.

DETAILED DESCRIPTION

Figure 1:
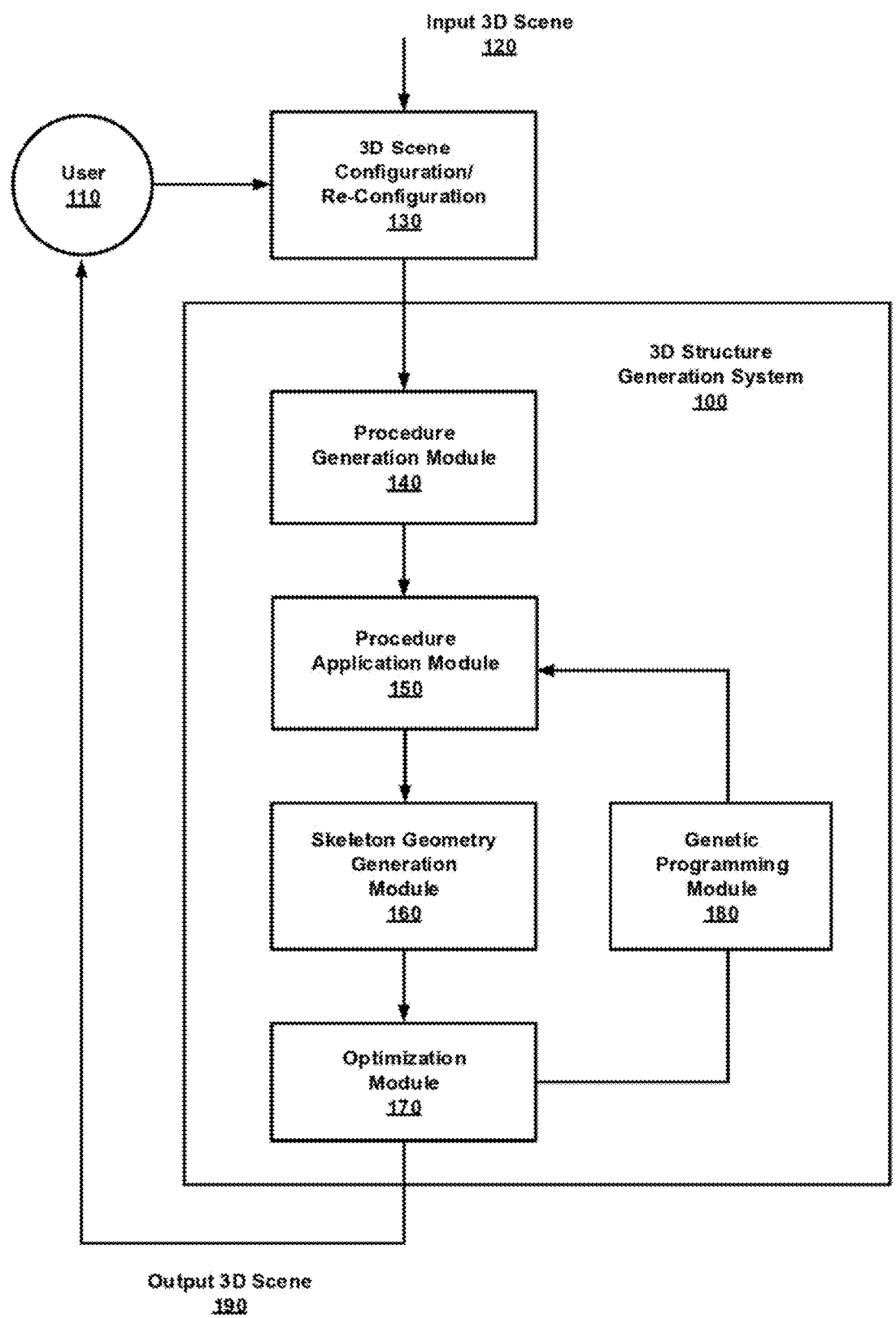
FIG. 1 is a block diagram of a system for generation of 3D structures, configured in accordance with an embodiment of the present disclosure.

As noted previously, the generation of 3-dimensional (3D) models using existing techniques can be difficult, time-consuming, and expensive, since the process generally involves drawing very large numbers of small detailed shapes using complex software tools that require expertise and/or artistic capability. In short, there are no known techniques designed to leverage a set of given constraints to generate a 3D model of a new object that interacts with an existing object, wherein the given constraints include or are otherwise derived from an interaction surface of the existing object. To this end, it would be desirable to have a system that is capable of generating a 3D structure with minimal user input and supervision, for example based on a limited set of relatively simple user-specified geometric and functional constraints for the object to be generated. For example, if the goal is to generate a 3D structure of a chair, the user may specify an enclosing volume of the desired chair (e.g., a bounding box that includes the space where the chair will exist), interaction surfaces between the chair and a model of a human being that will sit in the chair (e.g., the human's relatively vertical back and relatively horizontal buttocks and back-thigh area), and one or more factors that are instructive about the construction of the chair (e.g., an upper limit for the mass of the chair, load bearing requirements of the chair, and specific materials from which the chair is made). The system can then generate a 3D structure for the chair which meets those requirements. As will be appreciated in light of this disclosure, these geometric and functional constraints for the object to be generated can be provided directly by the user, or indirectly by way of the user providing a model with which the object is to interact. In the latter indirect case, note that the given model can be used to infer, or is otherwise intuitively instructive of, the relative constraints such as an enclosing volume of the desired chair. The system may further allow the user to modify the constraints and iterate the process, if desired, until a satisfactory result is achieved. Note that the modification of the constraints can be done directly, or indirectly by modifying the model with which the object is to interact.

Thus, techniques are disclosed for generation of 3D structures based on user-specified or otherwise given functional and geometric constraints. These constraints can be specified or otherwise provided in a relatively easy manner, by use of a model with which the target 3D structure is to interact. In this way, the given model can be used to seed the construction of the target 3D structure. These techniques employ graph-based procedural models that evolve through genetic programming. The procedural models are families of systems that specify rules for the interconnection of vertices using edges, as will be explained in greater detail below. These systems are referred to herein as vertex-rule-graph (VRG) systems. The VRG systems can be initialized with randomly selected rules and values. The rules are applied in parallel to an initial set of vertices which expand through the connecting edges, as specified by the rules, to generate complex 3D geometries. The resulting structures can be evaluated against the user-specified or otherwise given constraints, and the best performing VRG systems of the family can be selected for mutation into the next generation (iteration) of the process. The iteration continues through many generations as the VRG systems evolve to produce more suitable rules, until the resulting 3D structure satisfies the user's requirements.

In more detail, and in accordance with an embodiment of the present disclosure, a system is configured to generate 3D structures using graph-based procedural models that are iteratively modified by genetic programming to satisfy functional and geometric constraints. For example, in one embodiment, a family of vertex-rule-graph (VRG) systems are initialized and configured to provide rules that specify edge connections between vertices as well as parametric properties of the vertices. The rules are applied to an initial set of vertices to generate 3D graphs using each of the VRG systems. The initial set of vertices can be associated with user-specified or otherwise inferred interaction surfaces of a 3D model that will interact with the structure to be generated. Skeleton geometries are then generated for the 3D graphs, and an associated objective function is calculated. The objective function is configured to evaluate the fitness of the skeleton geometries based on user-specified geometric and functional constraints. The desired 3D structure is generated through iterative application of genetic programming techniques to a selected subset of the family of VRG systems to minimize the objective function and maximize the fitness of the structure. User feedback, for example in the form of updated constraints and interaction surfaces (e.g., based on manipulation of the seed model), may be incorporated in the iterative process to help guide the evolution, until the user is satisfied with the result.

Thus, the foregoing framework provides a tool to generate 3D structures in a relatively efficient fashion with minimal user input or supervision, compared to existing techniques, based on a minimal set of user-provided or otherwise inferred functional and geometric constraints derived from a model with which the target 3D structure is to interact. The disclosed techniques improve efficiency, reduce production time, and lower the cost of 3D modelling. Numerous configurations and variations will be apparent in light of this disclosure.

System Architecture

FIG. 1 is a block diagram of a system 100 for generation of 3D structures, configured in accordance with an embodiment of the present disclosure. As can be seen, the system 100 comprises a procedure generation module 140, a procedure application module 150, a skeleton geometry generation module 160, an optimization module 170, and a genetic programming module 180, the operations of which will be described in greater detail below.

Figure 2:
FIG. 2 illustrates an example of a given 3D model with which the generated 3D structure will interact, in accordance with an embodiment of the present disclosure.

The process begins by providing an input 3D scene 120 that contains one or more models of objects that are intended to interact with the 3D structures to be generated. The models may be provided from a user or operator 110 of the system and/or may be obtained from a suitable database of such models. FIG. 2 illustrates an example of a user provided 3D model 200, with which the generated 3D structure will interact. In this example, the 3D model 200 is of a human in a sitting position, which will be used to guide the generation of a chair structure to support the human model.

Figure 3:
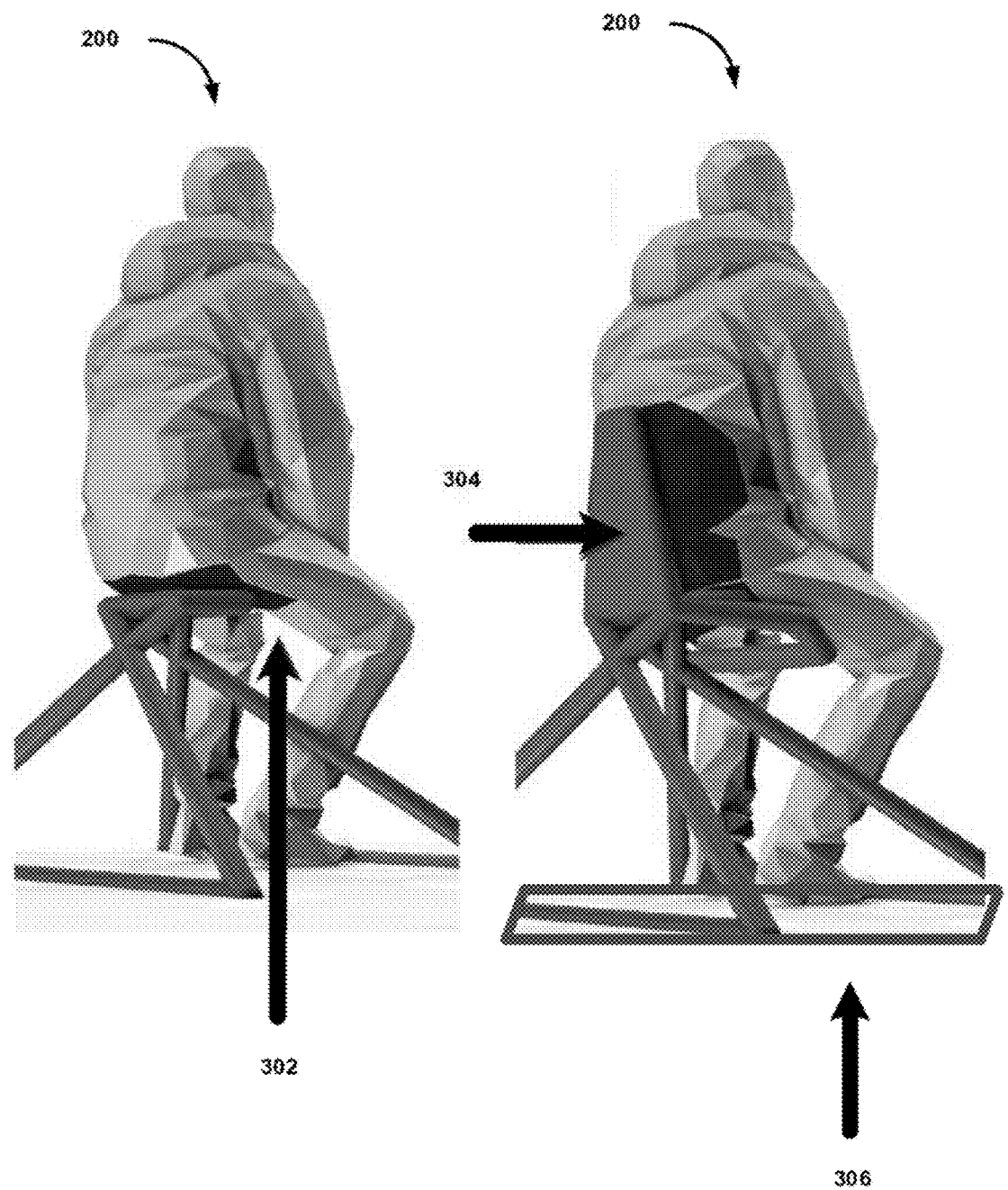
FIG. 3 illustrates selected interaction surfaces of the 3D model, in accordance with an embodiment of the present disclosure.

At operation 130, the user 110 configures (or re-configures) the scene, for example by specifying interaction surfaces. This is shown in FIG. 3 which illustrates user-specified interaction surfaces of the 3D model, in accordance with an embodiment of the present disclosure. In this example, one of the interaction surfaces 302 is the region of the human model 200 through which the chair will support the weight of the human. A second interaction surface 304 is associated with the lower back of the human model 200 which will be supported by a backrest feature of the chair. The floor 306 is also specified as an interaction surface, through which the components of the chair should not penetrate. The interaction surfaces in this example are painted red by the user during the 3D scene configuration process 130. Of course, additional interaction surfaces (not illustrated) are possible such as, for example, the back of the head for a headrest, and portions of the arms for armrests.

More complex scenes are possible. For example, many human models may be provided in a scene, each positioned to interact with different structures in different ways. And, of course, the models need not be restricted to humans. For example, the model could represent an item of cargo intended to be transported on a trailer, where the trailer is the 3D structure to be generated and which should be adapted to the type of cargo.

The user 110 may also provide other functional and geometric constraints, beyond the interaction surfaces. Many types of constraint are possible. For example, an enclosing volume can be specified such that the resulting structure must be contained within that volume space. Similarly, an avoidance volume can be specified such that the resulting structure must not extend into that volume space. Additionally, a floor or ground plane can be specified, from which the structure can extend upwards but not project beneath.

A maximum and/or minimum total length of all of the vertices may be specified, for example, to control the complexity and perhaps the cost of the resulting 3D structure. Similarly, a maximum and/or minimum total mass of the resulting structure may be specified. The mass may, in general, be related to the number and size of the components (e.g., vertices and edges). In some embodiments specific mass values may be provided for the components, for example in the rules of the VRG systems. Symmetry constraints may also be specified, requiring for example that the resultant structure be symmetric about one or more axes.

Stability constraints may also be provided. For example, the center of mass of the resulting structure may be required to be bounded within a specified region internal to the structure such that it is resistant to toppling over under the force of gravity or other applied forces. Such stability constraints may be further extended or related to the ability of the structure to stand, support another object, and/or be pushed, pulled, or grasped in any desired manner.

Additionally, weighting scale factors may be provided to emphasize or deemphasize one or more of the selected constraints in the process of measuring the fitness of the generated structure, according to the disclosed techniques. The above list of constraints is provided as an example and is not intended to be all-inclusive. Any constraint which can be efficiently evaluated may potentially be used to guide the process, including aerodynamics or other physical properties, as well as aesthetic criteria upon which a measure can be placed.

Figure 4:
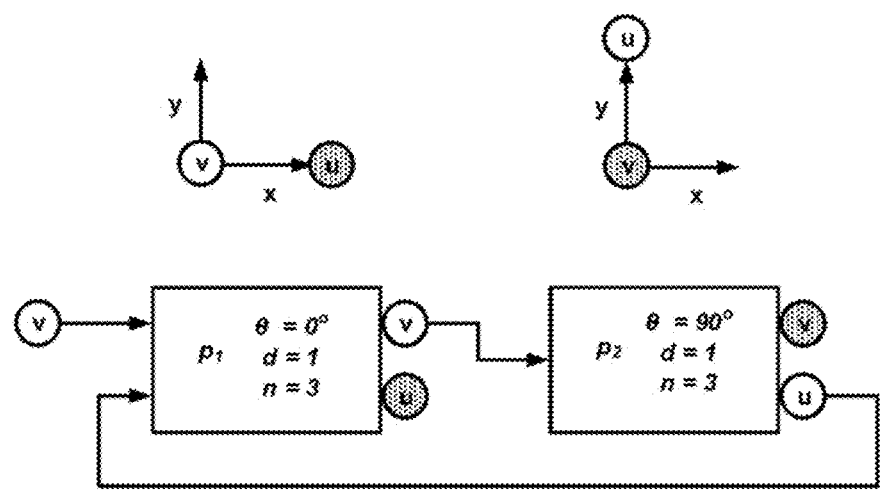
FIG. 4 illustrates rule graphs and rule graph expansions, in accordance with an embodiment of the present disclosure.
Figure 4:
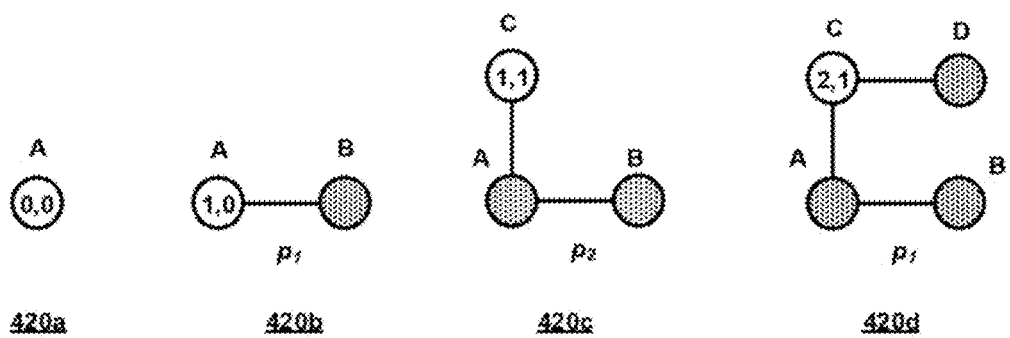
Figure 4:
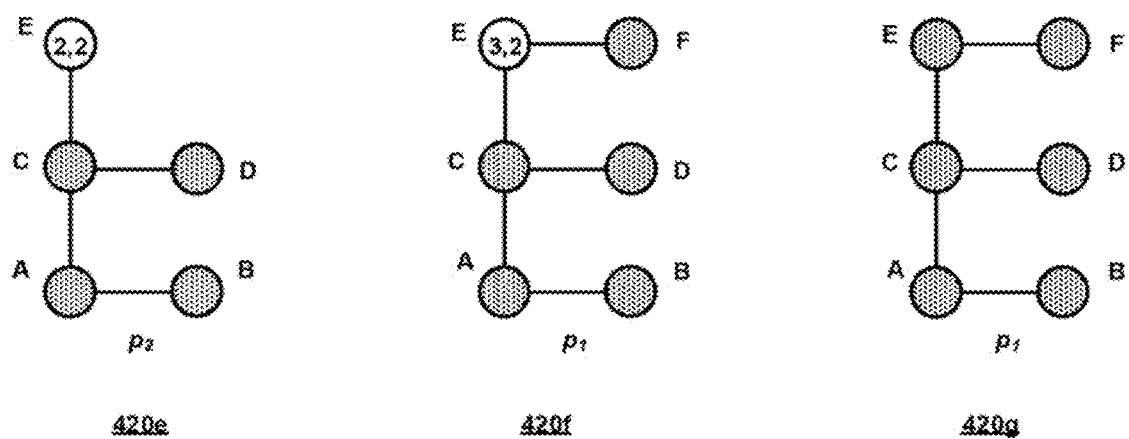

Procedure generation module 140 is configured to generate an initial set of rules (also referred to as rule graphs) for a family of VRG systems. Procedure application module 150 is configured to apply those rules to a set of vertices. These rule graphs and their application are illustrated in FIG. 4 which shows example rule graphs 410 and rule graph expansions 420, in accordance with an embodiment of the present disclosure. Rule graph 410, in this simplified 2-dimensional example, is shown to include two rules $P_1$ and $P_2$, which are linked together. Rule $P_1$ specifies the generation of an edge connection between a first vertex v and a second vertex u in a direction of theta=0 degrees (e.g., along the x-axis), with a distance length (d) of 1 unit. Note that in the more general 3D case, the rule can specify two direction vectors, to describe direction in both polar and azimuth angles, or any other convenient coordinate system. The rule also specifies a recursion limit n=3, as will be explained below, in connection with the rule expansion. The rule further specifies that the second vertex u is set to an inactive state (indicated by the shading), while the first vertex v remains in an active state, as will also be explained below.

Rule $P_2$ specifies the generation of a second edge connection between the active vertex v, from rule $P_1$, to a second new vertex u in a direction of theta=90 degrees (e.g., along the y-axis), also with a distance length (d) of 1 unit and a recursion limit of n=3. Rule $P_2$ also specifies that the new second vertex u is set to an active state, while the first vertex v is set to an inactive state (indicated by the shading). The rule graph further indicates that rule $P_2$ is linked back to rule $P_1$, with respect to vertex u.

In addition to connection rules, the VRG systems may specify property parameters of the vertices. In some embodiments, these parameters include the active/inactive state flag and recursion limit, as mentioned above, as well as an orthonormal set of vectors to define the coordinate system of the vertex, and radii of cylinders and spheres to be used in the generation of the skeleton geometry, as will be described below. Any number of other suitable parameters or attributes may also be included.

In some embodiments, procedure generation module 140 may be configured to initialize the rule graphs of each of the VRG systems with randomized connections between the vertices and with randomized property parameters of the vertices. These initial random values, although unlikely to generate satisfactory structures in the first iteration, will eventually converge to produce desired results after a number of iterations or evolutions of the genetic programming techniques described below.

FIG. 4 also illustrates expansion 420 of a vertex to newly generated vertices through edge connections based on recursive applications of the rules of rule graph 410, described above. Procedure application module 150 is configured to apply those rules to expand an initial set of vertices into a graph. In some embodiments, the initial set of vertices may begin at the interaction surfaces. The expansion, in this simplified example, begins with an initial vertex designated A, at 420a, which is labeled with recursion counters (0,0) to indicate the number of recursive applications of rules $P_1$ and $P_2$ respectively. The recursion counters are initially set to zero as neither rule has yet been applied. Next, at 420b, rule $P_1$ is applied to generate new vertex B in a direction of 0 degrees, at a distance of 1 unit, in an inactive state. The vertex A recursion counters are updated to (1,0) to indicate one application of rule $P_1$. Next, at 420c, rule $P_2$ is applied to active vertex A, in accordance with rule graph 410 (the rules alternate their expansion), to generate new vertex C in a direction of 90 degrees, at a distance of 1 unit, in an active state. Vertex A is set to inactive and the recursion counters are now associated with active vertex C which are updated to (1,1) to indicate one application of rule $P_1$ and one application of rule $P_2$.

Next, at 420d, rule $P_1$ is applied to active vertex C, in accordance with rule graph 410, to generate new vertex D in a direction of 0 degrees, at a distance of 1 unit, in an inactive state. Vertex C remains active and the recursion counters are updated to (2,1) to indicate two application of rule $P_1$ and one application of rule $P_2$.

Next, at 420e, rule $P_2$ is applied to active vertex C, in accordance with rule graph 410, to generate new vertex E in a direction of 90 degrees, at a distance of 1 unit, in an active state. Vertex C is set to inactive and the recursion counters are now associated with active vertex E which are updated to (2,2) to indicate two applications of rule $P_1$ and two applications of rule $P_2$.

Next, at 420f, rule $P_1$ is applied to active vertex E, in accordance with rule graph 410, to generate new vertex F in a direction of 0 degrees, at a distance of 1 unit, in an inactive state. Vertex E remains active and the recursion counters are updated to (3,2) to indicate three applications of rule $P_1$ and two applications of rule $P_2$. At this point, the recursion limit of 3 has been reached for vertex E, which sets all vertices involved in the expansion to the inactive state. Because there are no remaining active vertices in the graph, the expansion stops with the resulting structure that resembles a capital letter "E" at 420g.

In operation, the procedure application module 150 operates in parallel on each of the initial set of vertices to generate a 3D graph associated with each of the VRG systems. Thus, a population of 3D graphs are generated, one for each VRG system, upon which the genetic programming techniques described below can be applied.

Skeleton geometry generation module 160 is configured to generate a skeleton geometry or surface representation from each of the 3D graphs by incorporating object proxies such as cylinders and spheres to represent the vertices and edge connections. The radii of the cylinders and spheres may be specified by the vertex parameters or attributes stored in the rules of the VRG systems.

Optimization module 170 is configured to calculate an objective function for each of the skeleton geometries. The objective function is configured to evaluate the fitness of each of the skeleton geometries based on the user-specified constraints. In some embodiments, the objective function can be expressed as a weighted summation of mathematical terms that suitably describe each of the user-specified constraints, as previously described. The objective function can be evaluated for the graphs that were generated by each of the VRG systems, so that the systems can be scored and ranked/sorted for use in the genetic programming process.

Genetic programming module 180 is configured to generate the 3D structure through iterative application of genetic programming techniques, including graph crossover and mutation, to the rule graphs of a selected subset of the family of VRG systems.

Figure 5:
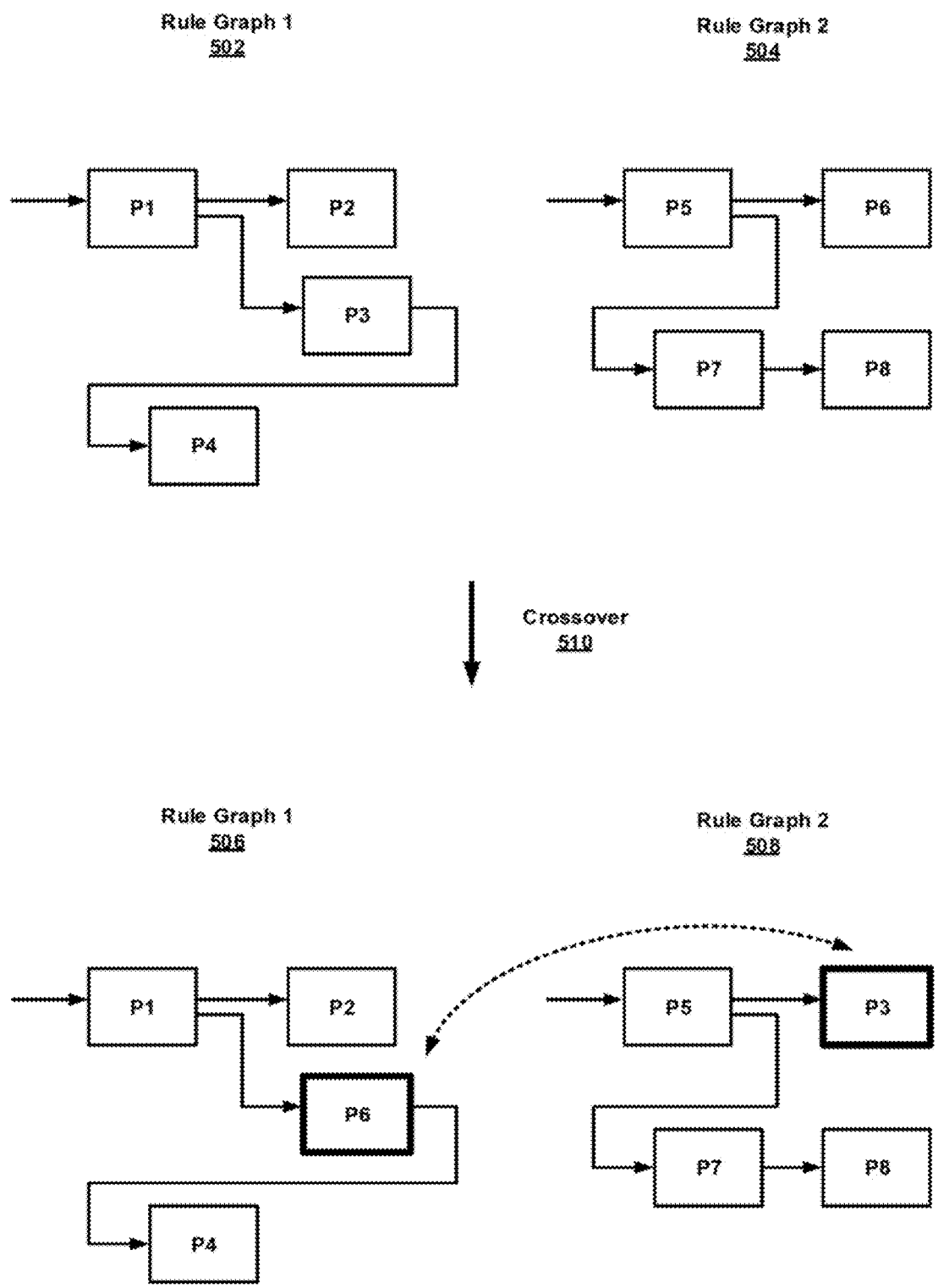
FIG. 5 illustrates graph crossovers associated with genetic programming applied to vertex-rule-graph (VRG) systems, in accordance with an embodiment of the present disclosure.

A selected fraction, for example ten percent, of the rule graphs of the highest scoring VRG systems are subjected to graph crossovers. The graph crossover process is illustrated in FIG. 5. Two rule graphs are shown in the top portion of the figure, rule graph one 502 and rule graph two 504. A rule graph crossover operation 510 is then performed to exchange or swap two randomly selected rules, in this example rules P3 and P6, between the rule graphs to generate modified rule graphs 506 and 508. The exchanging or swapping of rules includes the exchanging of rule parameters and edges. In some embodiments, more than one pair of rules may be exchanged between rule graphs. The resulting graph crossovers are copied forward into the next generation (iteration).

In some embodiments, the genetic programming module 180 also performs elitism, wherein two to three of the best rule graphs are copied forward intact into the next generation. Finally, random mutations are applied to the next generation of rule graphs, by randomly varying a small percentage (e.g., one percent) of the connection rules and vertex parameters. This next generation of rule graphs is fed back to procedure application module 150 for a subsequent iteration (evolution) of the graph generation process, until the objective function reaches a desired threshold indicating that a satisfactory 3D structure may have been generated. The resulting structure, which can be embedded and an output 3D scene 190, is presented to the user for approval or modification, as previously described.

Figure 6:
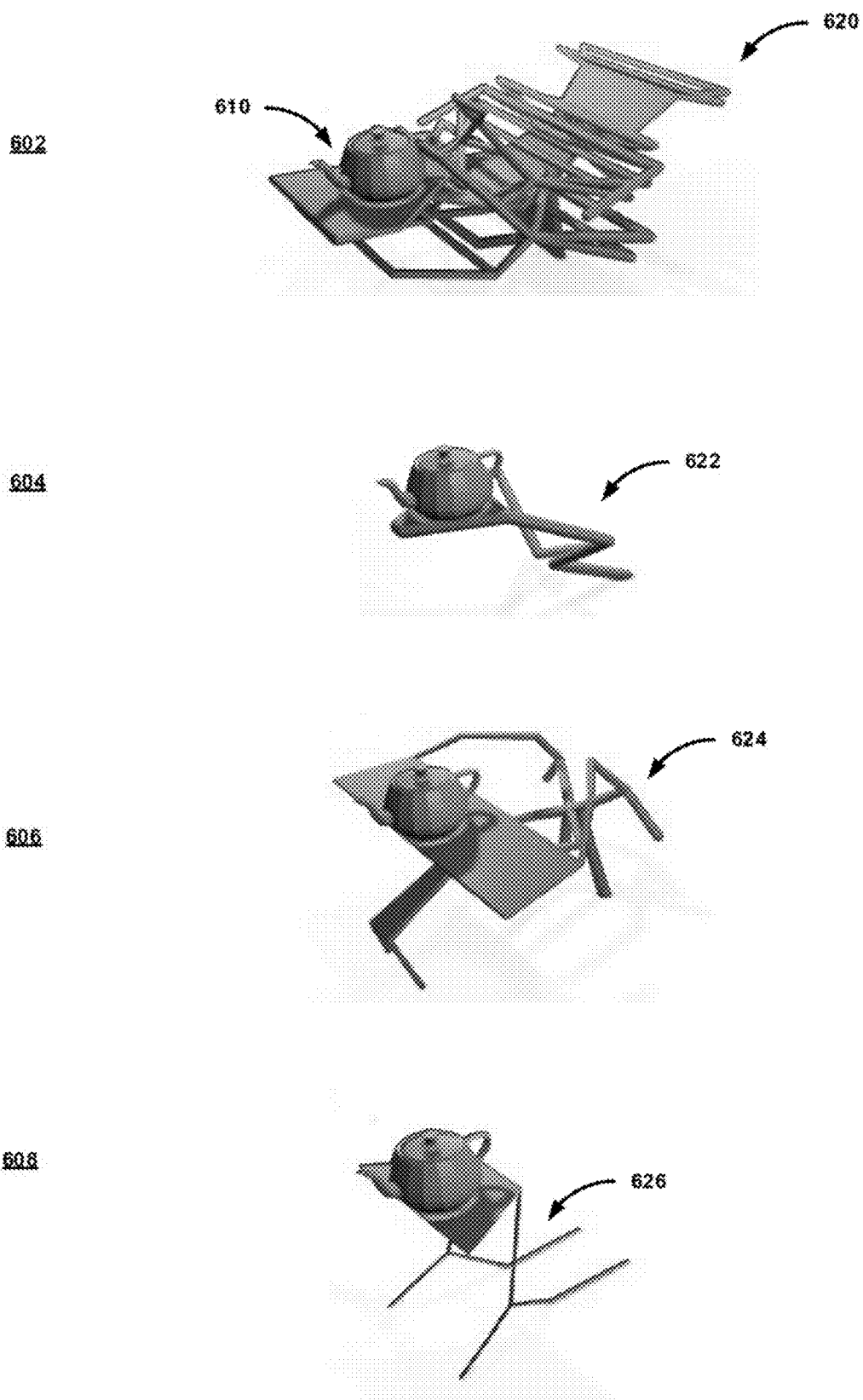
FIG. 6 illustrates example 3D structures generated in response to varying constraints associated with a given object model, in accordance with an embodiment of the present disclosure.

FIG. 6 illustrates example 3D structures generated in response to varying constraints, in accordance with an embodiment of the present disclosure. A 3D model of a teapot 610 is provided to the system for which a supporting structure is to be generated. In example 602, the user-specified constraints were limited to the definition of an interaction surface upon which the teapot would rest, with no other restrictions. The resulting supporting structure 620 is shown, which includes a relatively large number of seemingly unnecessary components.

In example 604, the user specified-constraints included an extra restriction to minimize the overall length of the structure. As can be seen, the resulting structure 622 is much simpler with fewer components, although it appears to be unstable (e.g., it would likely tip over under the weight of the teapot).

In example 606, the user specified-constraints further includes an additional restriction to add stability to the structure. As can be seen, the resulting structure 624 has multiple points of contact with the ground plane to increase stability. Finally, in example 608, an additional restriction is included to minimize the mass of the structure, while maintaining the shortened length and increased stability. As can be seen, the resulting structure 626 is more streamlined and may provide the desired result for the user.

Methodology

Figure 7:
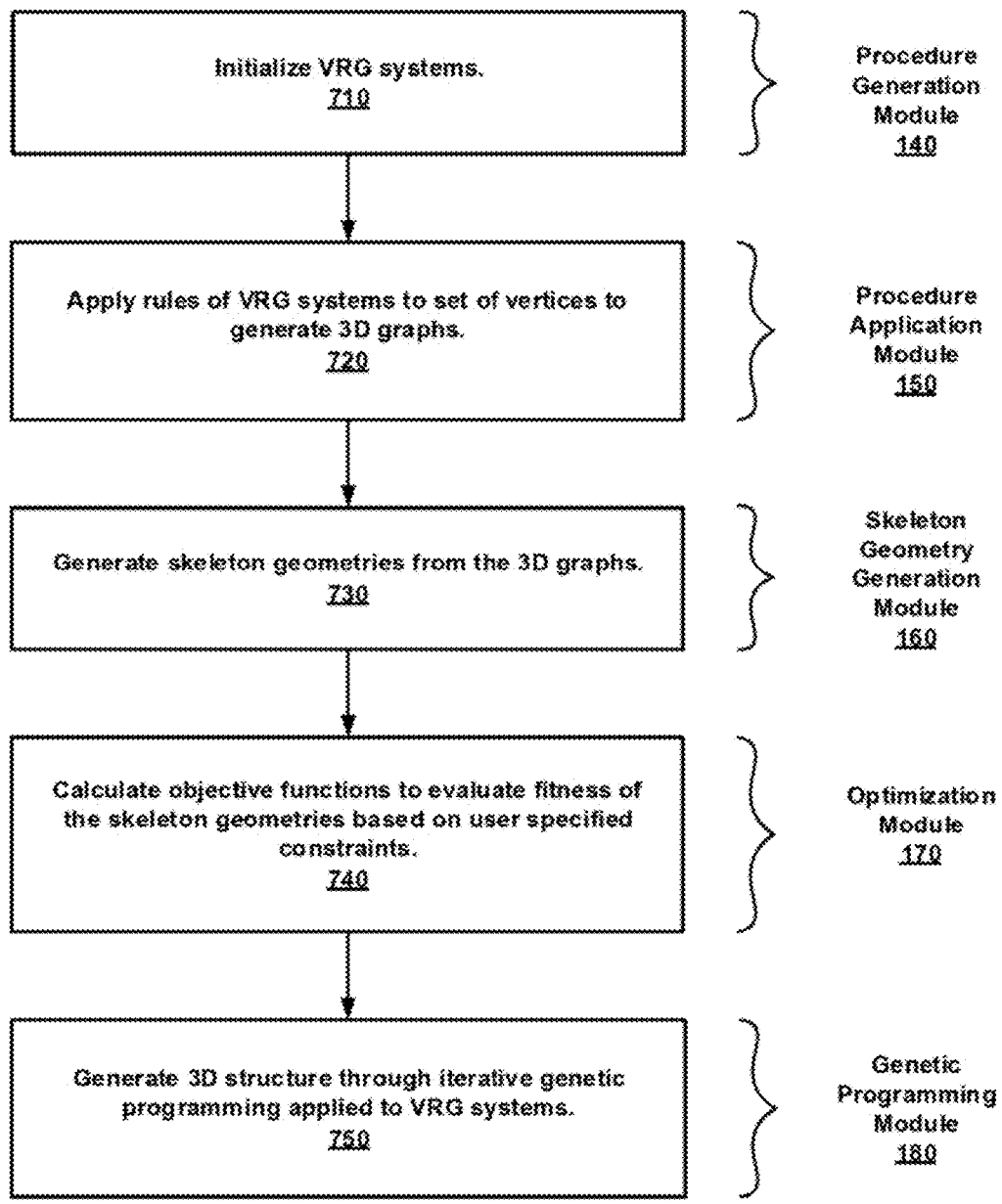
FIG. 7 is a flowchart illustrating a method for generation of 3D structures, in accordance with an embodiment of the present disclosure.

FIG. 7 is a flowchart illustrating a method 700 for the generation of 3D structures using genetic programming to satisfy functional and geometric constraints, in accordance with an embodiment of the present disclosure. As can be seen, the method is described with reference to the configuration of procedure generation module 140, procedure application module 150, skeleton geometry generation module 160, optimization module 170, and genetic programming module 180, of FIG. 1. However, any number of module configurations can be used to implement the method, as will be appreciated in light of this disclosure. Further note that the various functions depicted in the method do not need to be assigned to the specific example modules shown. To this end, the example methodology depicted is provided to give one example embodiment and is not intended to limit the methodology to any particular physical or structural configuration.

The method commences, at operation 710, by initializing a number of vertex-rule-graph (VRG) systems from a selected population of such VRG systems. The VRG systems are configured to provide rules that specify edge connections between vertices and property parameters of the vertices. In some embodiments, the initialization comprises initializing the rules of the VRG systems with randomized connections between the vertices and with randomized property parameters of the vertices. The initialization is performed prior to a first iteration of the method (e.g., prior to the first iteration of genetic programming).

The method continues, at operation 720, by applying the rules of the VRG systems to an initial set of vertices to generate 3D graphs. Each of the 3D graphs is associated with one of the VRG systems. The initial set of vertices is associated with a user-specified interaction surface between the structure to be generated and a user provided 3D model, as previously described.

Next, at operation 730, skeleton geometries are generated for each of the 3D graphs. In some embodiments, the skeleton geometries are generated by replacing the edge connections of the 3D graphs with cylinders and replacing the vertices of the 3D graphs with spheres. The cylinders and spheres may be characterized by vertex attributes included in the rules of the VRG systems.

At operation 740, an objective function is calculated for each of the skeleton geometries. The objective function is configured to evaluate the fitness of the skeleton geometries based on user-specified geometric and functional constraints. In some embodiments, the constraints may include one or more of a fitting volume, an avoidance volume, a symmetry requirement, the interaction surfaces, a maximum total length of the edge connections, and a maximum mass of the 3D structure.

At operation 750, a 3D structure is generated through iterative application of genetic programming techniques to the VRG systems to minimize the objective function. In some embodiments, the genetic programming techniques include performing graph crossovers of the VRG systems and applying mutations to the rules and vertices of the VRG systems, as previously described.

In some embodiments, additional operations are performed. For example, in one embodiment, initial results are provided to the user and feedback is obtained for incorporation in the iterative process. The user feedback may include updated constraints, updated weighting factors for the constraints, and updated interaction surfaces.

Example Platform

Figure 8:
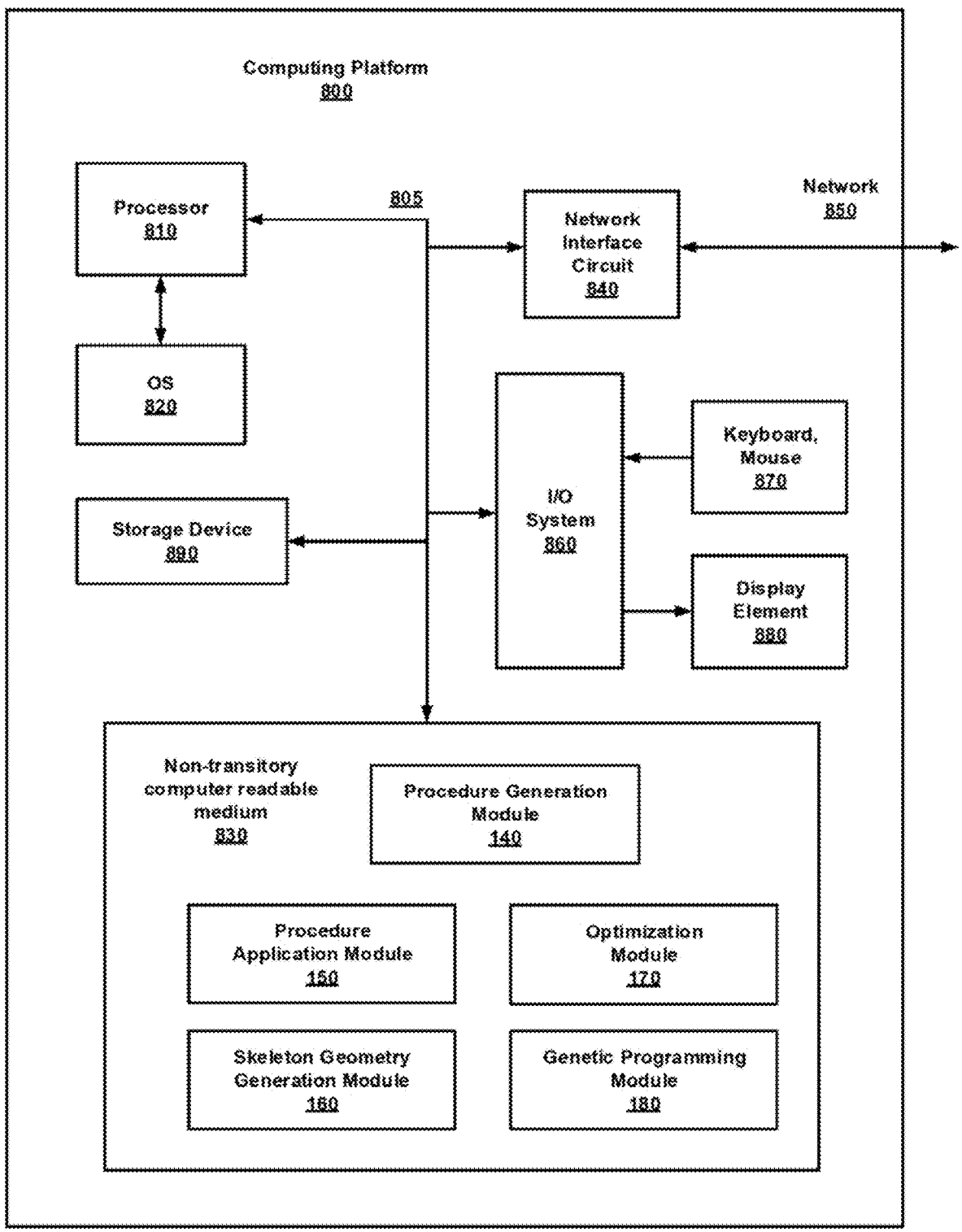
FIG. 8 is a block diagram schematically illustrating a computing platform configured to perform any of the techniques as variously described in this disclosure, configured in accordance with an embodiment of the present disclosure.

FIG. 8 is a block diagram schematically illustrating a computing platform or device 800 used to perform any of the techniques as variously described in this disclosure. For example, in some embodiments, system for generation of 3D structures of FIG. 1, or any portions thereof, and the methodologies of FIG. 7, or any portions thereof, are implemented in the computing platform 800. In some embodiments, the computing platform 800 is a computer system, such as a workstation, desktop computer, server, laptop, handheld computer, tablet computer (e.g., the iPad tablet computer), mobile computing or communication device (e.g., the iPhone mobile communication device, the Android mobile communication device, and the like), or other form of computing or telecommunications device that is capable of communication and that has sufficient processor power and memory capacity to perform the operations described in this disclosure. In some embodiments, a distributed computational system is provided comprising a plurality of such computing devices.

The computing platform 800 includes one or more storage devices 890 and/or non-transitory computer-readable media 830 having encoded thereon one or more computer-executable instructions or software for implementing techniques as variously described in this disclosure. In some embodiments, the storage devices 890 includes a computer system memory or random access memory, such as a durable disk storage (e.g., any suitable optical or magnetic durable storage device, including RAM, ROM, Flash, USB drive, or other semiconductor-based storage medium), a hard-drive, CD-ROM, or other computer readable media, for storing data and computer-readable instructions and/or software that implement various embodiments as taught in this disclosure. In some embodiments, the storage device 890 includes other types of memory as well, or combinations thereof. In one embodiment, the storage device 890 is provided on the computing platform 800. In another embodiment, the storage device 890 is provided separately or remotely from the computing platform 800. The non-transitory computer-readable media 830 include, but are not limited to, one or more types of hardware memory, non-transitory tangible media (for example, one or more magnetic storage disks, one or more optical disks, one or more USB flash drives), and the like. In some embodiments, the non-transitory computer-readable media 830 included in the computing platform 800 store computer-readable and computer-executable instructions or software for implementing various embodiments. In one embodiment, the computer-readable media 830 are provided on the computing platform 800. In another embodiment, the computer-readable media 830 are provided separately or remotely from the computing platform 800.

The computing platform 800 also includes at least one processor 810 for executing computer-readable and computer-executable instructions or software stored in the storage device 890 and/or non-transitory computer-readable media 830 and other programs for controlling system hardware. In some embodiments, virtualization is employed in the computing platform 800 so that infrastructure and resources in the computing platform 800 are shared dynamically. For example, a virtual machine is provided to handle a process running on multiple processors so that the process appears to be using only one computing resource rather than multiple computing resources. In some embodiments, multiple virtual machines are used with one processor.

As can be further seen, an interconnect 805 is also provided to allow for communication between the various components listed above and/or other components not shown. Computing platform 800 can be coupled to a network 850 (e.g., a local or wide area network such as the internet), through network interface circuit 840 to allow for communications with other computing devices, platforms, resources, clients, and Internet of Things (IoT) devices.

In some embodiments, a user interacts with the computing platform 800 through an input/output system 860 that interfaces with devices such as a keyboard and mouse 870 and/or a display element (screen/monitor) 880 which provides a user interface to accept user input and guidance, for example to configure or control the 3D structure generation. In some embodiments, the computing platform 800 includes other I/O devices (not shown) for receiving input from a user, for example, a pointing device or a touchpad, etc., or any suitable user interface. In some embodiments, the computing platform 800 includes other suitable conventional I/O peripherals. The computing platform 800 can include and/or be operatively coupled to various suitable devices for performing one or more of the aspects as variously described in this disclosure.

In some embodiments, the computing platform 800 runs an operating system (OS) 820, such as any of the versions of Microsoft Windows operating systems, the different releases of the Unix and Linux operating systems, any version of the MacOS for Macintosh computers, any embedded operating system, any real-time operating system, any open source operating system, any proprietary operating system, any operating systems for mobile computing devices, or any other operating system capable of running on the computing platform 800 and performing the operations described in this disclosure. In one embodiment, the operating system runs on one or more cloud machine instances.

As will be appreciated in light of this disclosure, the various modules and components of the system, including the procedure generation module 140, the procedure application module 150, the skeleton geometry generation module 160, the optimization module 170, and the genetic programming module 180, can be implemented in software, such as a set of instructions (e.g., HTML, XML, C, C++, object-oriented C, JavaScript, Java, BASIC, etc.) encoded on any computer readable medium or computer program product (e.g., hard drive, server, disc, or other suitable non-transient memory or set of memories), that when executed by one or more processors, cause the various methodologies provided in this disclosure to be carried out. It will be appreciated that, in some embodiments, various functions and data transformations performed by the user computing system, as described in this disclosure, can be performed by similar processors and/or databases in different configurations and arrangements, and that the depicted embodiments are not intended to be limiting. Various components of this example embodiment, including the computing platform 800, can be integrated into, for example, one or more desktop or laptop computers, workstations, tablets, smart phones, game consoles, set-top boxes, or other such computing devices. Other componentry and modules typical of a computing system, such as, for example a co-processor, a processing core, a graphics processing unit, a touch pad, a touch screen, etc., are not shown but will be readily apparent.

In other embodiments, the functional components/modules are implemented with hardware, such as gate level logic (e.g., FPGA) or a purpose-built semiconductor (e.g., ASIC). Still other embodiments are implemented with a microcontroller having a number of input/output ports for receiving and outputting data, and a number of embedded routines for carrying out the functionality described in this disclosure. In a more general sense, any suitable combination of hardware, software, and firmware can be used, as will be apparent.

Example Embodiments

Numerous example embodiments will be apparent, and features described herein can be combined in any number of configurations.

Example 1 includes a method to generate a 3-dimensional (3D) structure. The method comprises: receiving, by a processor-based system, one or more constraints relevant to a 3D structure to be generated, at least one of the one or more constraints derived from a designated interaction surface of a given 3D model; and generating, by the processor-based system, the 3D structure using the one or more constraints, including the designated interaction surface of the given 3D model, through iterative application of genetic programming to a plurality of vertex-rule-graph (VRG) systems to evolve the VRG systems based on the constraints.

Example 2 includes the subject matter of Example 1, wherein the generating further comprises: initializing, by the processor-based system, the plurality of VRG systems, the VRG systems configured to provide rules that specify edge connections between vertices and property parameters of the vertices; applying, by the processor-based system, the rules of the VRG systems to an initial set of vertices to generate a plurality of 3D graphs, each of the 3D graphs associated with one of the VRG systems, wherein the initial set of vertices is associated with the designated interaction surface of the given 3D model; generating, by the processor-based system, a plurality of skeleton geometries, each of the skeleton geometries associated with one of the 3D graphs; calculating, by the processor-based system, an objective function for each of the skeleton geometries, the objective function configured to evaluate fitness of the skeleton geometries based on given constraints, the given constraints including the interaction surface of the given 3D model; and generating, by the processor-based system, the 3D structure through iterative application of genetic programming to a selected subset of the plurality of VRG systems, the genetic programming iterations to minimize the objective function.

Example 3 includes the subject matter of Examples 1 or 2, wherein the genetic programming further comprises performing graph crossovers of the VRG systems and applying mutations to the rules and vertices of the VRG systems.

Example 4 includes the subject matter of any of Examples 1-3, wherein the initializing further comprises initializing the rules of the plurality of VRG systems with randomized connections between the vertices and with randomized property parameters of the vertices, the initializing performed prior to a first iteration of the method.

Example 5 includes the subject matter of any of Examples 1-4, wherein the VRG system rules specifying edge connections between vertices comprise at least one of a direction parameter, a distance parameter, a recursion limit parameter, and a symmetry flag.

Example 6 includes the subject matter of any of Examples 1-5, wherein the VRG system rules specifying property parameters of the vertices comprise at least one of an active/inactive state flag of the vertex, orthonormal vectors defining a coordinate system of the vertex, and recursion counters for each of the rules to be applied to the vertex.

Example 7 includes the subject matter of any of Examples 1-6, wherein the generating of the skeleton geometries further comprises replacing the edge connections of the 3D graphs with cylinders and replacing the vertices of the 3D graphs with spheres.

Example 8 includes the subject matter of any of Examples 1-7, wherein the constraints further comprise at least one of a fitting volume, an avoidance volume, a symmetry requirement, a maximum total length of the edge connections, and a maximum mass of the 3D structure.

Example 9 includes the subject matter of any of Examples 1-8, further comprising: presenting the generated 3D structure for display; receiving one or more updated constraints, including one or more updated interaction surfaces; receiving weighting factors associated with the constraints including the one or more updated constraints; and iterating the method using the weighting factors and the one or more updated constraints.

Example 10 is a system to generate a 3-dimensional (3D) structure. The system comprises: one or more processors; a procedure generation module at least one of controllable and executable by the one or more processors, and configured to initialize a plurality of vertex-rule-graph (VRG) systems, the VRG systems configured to provide rules that specify edge connections between vertices and property parameters of the vertices; a procedure application module at least one of controllable and executable by the one or more processors, and configured to apply the rules of the VRG systems to an initial set of vertices to generate a plurality of 3D graphs, each of the 3D graphs associated with one of the VRG systems, wherein the initial set of vertices is associated with a designated interaction surface of a 3D model; a skeleton geometry generation module at least one of controllable and executable by the one or more processors, and configured to generate a plurality of skeleton geometries, each of the skeleton geometries associated with one of the 3D graphs; an optimization module at least one of controllable and executable by the one or more processors, and configured to calculate an objective function for each of the skeleton geometries, the objective function configured to evaluate fitness of the skeleton geometries based on given constraints, wherein the given constraints comprise at least one of a fitting volume, an avoidance volume, a symmetry requirement, the interaction surfaces, a maximum total length of the edge connections, and a maximum mass of the 3D structure; and a genetic programming module at least one of controllable and executable by the one or more processors, and configured to generate the 3D structure through iterative application of genetic programming to a selected subset of the plurality of VRG systems, the genetic programming iterations to minimize the objective function, wherein the genetic programming module is further configured to perform graph crossovers of the VRG systems and to apply mutations to the rules and vertices of the VRG systems.

Example 11 includes the subject matter of Example 10, wherein the procedure generation module is further configured to initialize the rules of the plurality of VRG systems with randomized connections between the vertices and with randomized property parameters of the vertices, the initializing performed prior to a first iteration of the genetic programming.

Example 12 includes the subject matter of Examples 10 or 11, wherein the VRG system rules specifying edge connections between vertices comprise at least one of a direction parameter, a distance parameter, a recursion limit parameter, and a symmetry flag; and the VRG system rules specifying property parameters of the vertices comprise at least one of an active/inactive state flag of the vertex, orthonormal vectors defining a coordinate system of the vertex, and recursion counters for each of the rules to be applied to the vertex.

Example 13 is a non-transitory computer program product having instructions encoded thereon that when executed by one or more computer processors cause the one or more computer processors to perform a process comprising: receiving one or more constraints relevant to a 3D structure to be generated, at least one of the one or more constraints derived from a designated interaction surface of a given 3D model; and generating the 3D structure using the one or more constraints, including the designated interaction surface of the given 3D model, through iterative application of genetic programming to a plurality of vertex-rule-graph (VRG) systems to evolve the VRG systems based on the constraints.

Example 14 includes the subject matter of Example 13, wherein the generating further comprises: initializing the plurality of VRG systems, the VRG systems configured to provide rules that specify edge connections between vertices and property parameters of the vertices; applying the rules of the VRG systems to an initial set of vertices to generate a plurality of 3D graphs, each of the 3D graphs associated with one of the VRG systems, wherein the initial set of vertices is associated with the designated interaction surface of the given 3D model; generating a plurality of skeleton geometries, each of the skeleton geometries associated with one of the 3D graphs; calculating an objective function for each of the skeleton geometries, the objective function configured to evaluate fitness of the skeleton geometries based on given constraints, the given constraints including the interaction surface of the given 3D model; and generating the 3D structure through iterative application of genetic programming to a selected subset of the plurality of VRG systems, the genetic programming iterations to minimize the objective function.

Example 15 includes the subject matter of Examples 13 or 14, wherein the genetic programming further comprises performing graph crossovers of the VRG systems and applying mutations to the rules and vertices of the VRG systems.

Example 16 includes the subject matter of any of Examples 13-15, wherein the initializing further comprises initializing the rules of the plurality of VRG systems with randomized connections between the vertices and with randomized property parameters of the vertices, the initializing performed prior to a first iteration of the method.

Example 17 includes the subject matter of any of Examples 13-16, wherein the VRG system rules specifying edge connections between vertices comprise at least one of a direction parameter, a distance parameter, a recursion limit parameter, and a symmetry flag.

Example 18 includes the subject matter of any of Examples 13-17, wherein the VRG system rules specifying property parameters of the vertices comprise at least one of an active/inactive state flag of the vertex, orthonormal vectors defining a coordinate system of the vertex, and recursion counters for each of the rules to be applied to the vertex.

Example 19 includes the subject matter of any of Examples 13-18, wherein the generating of the skeleton geometries further comprises replacing the edge connections of the 3D graphs with cylinders and replacing the vertices of the 3D graphs with spheres.

Example 20 includes the subject matter of any of Examples 13-19, wherein the constraints further comprise at least one of a fitting volume, an avoidance volume, a symmetry requirement, a maximum total length of the edge connections, and a maximum mass of the 3D structure.

The foregoing description of example embodiments of the disclosure has been presented for the purposes of illustration and description. It is not intended to be exhaustive or to limit the disclosure to the precise forms disclosed. Many modifications and variations are possible in light of this disclosure. It is intended that the scope of the disclosure be limited not by this detailed description, but rather by the claims appended hereto.

What is claimed is:

1. A method to generate a 3-dimensional (3D) structure, the method comprising:
   receiving, by a processor-based system, one or more constraints relevant to a 3D structure to be generated, at least one of the one or more constraints derived from a designated interaction surface of a given 3D model; and
   generating, by the processor-based system, the 3D structure using the designated interaction surface of the given 3D model, through iterative application of genetic programming to a plurality of vertex-rule-graph (VRG) systems to evolve the VRG systems based on the one or more constraints;
   wherein a particular one of the VRG systems provides a rule that specifies (i) an edge connection between two vertices of the 3D structure and (ii) a recursion limit parameter for the rule;
   wherein, for a first application of the rule, a first one of the two vertices is an initial vertex associated with the designated interaction surface;
   wherein a second one of the two vertices is created based on applying the rule provided by the particular VRG system;
   wherein generating the 3D structure includes applying the rule a number of times specified by the recursion limit parameter, each application of the rule resulting in an additional vertex being added to the 3D structure; and
   wherein the edge connection specifies a direction parameter and a distance parameter.

2. The method of claim 1, wherein generating the 3D structure further comprises:
   applying, by the processor-based system, the rule of the particular VRG system to the initial vertex to generate a 3D graph associated with the particular VRG system;
   generating, by the processor-based system, a skeleton geometry associated with the 3D graph;
   calculating, by the processor-based system, an objective function for the skeleton geometry, the objective function configured to evaluate fitness of the skeleton geometry based on at least some of the one or more constraints; and
   generating, by the processor-based system, the 3D structure through iterative application of the genetic programming to a selected subset of the plurality of VRG systems, wherein iterative application of the genetic programming minimizes the objective function.

3. The method of claim 1, wherein the genetic programming further comprises performing graph crossovers of the VRG systems.

4. The method of claim 1, wherein generating the 3D structure further comprises initializing the rule with a randomized property parameter for at least one of the two vertices, the rule being initialized prior to a first iterative application of the genetic programming.

5. The method of claim 1, wherein the rule further specifies a symmetry flag.

6. The method of claim 1, wherein
   the rule further specifies a property parameter for at least one of the two vertices; and
   the property parameter comprises at least one of (a) an active/inactive state flag of at least one of the two vertices, or (b) orthonormal vectors defining a coordinate system of at least one of the two vertices.

7. The method of claim 2, wherein generating the skeleton geometry further comprises replacing the edge connection with a cylinder and replacing at least one of the two vertices with a sphere.

8. The method of claim 1, wherein at least one of the one or more constraints specifies at least one of a fitting volume, an avoidance volume, a symmetry requirement, a maximum total length of edge connections in the 3D structure, and a maximum mass of the 3D structure.

9. The method of claim 1, further comprising:
   presenting the generated 3D structure for display;
   receiving an updated interaction surface;
   receiving a weighting factor associated with the updated interaction surface; and
   performing an iterative application of the genetic programming using the weighting factor and the updated interaction surface.

10. A system to generate a 3-dimensional (3D) structure, the system comprising:
    one or more processors;
    a procedure generation module at least one of controllable and executable by the one or more processors, and configured to initialize a vertex-rule-graph (VRG) system that provides a rule that specifies (i) an edge connection between two vertices of the generated 3D structure and (ii) a recursion limit parameter for the rule, wherein the edge connection specifies a direction parameter and a distance parameter;
    a procedure application module at least one of controllable and executable by the one or more processors, and configured to apply the rule of the VRG system to an initial vertex to generate a 3D graph associated with the VRG system, wherein, for a first application of the rule, the initial vertex is associated with a designated interaction surface of a 3D model, and wherein a second one of the two vertices is created based on applying the rule of the VRG system;
    a skeleton geometry generation module at least one of controllable and executable by the one or more processors, and configured to generate a skeleton geometry associated with the 3D graph;
    an optimization module at least one of controllable and executable by the one or more processors, and configured to calculate an objective function for the skeleton geometry, the objective function configured to evaluate fitness of the skeleton geometry based on given constraints, wherein the given constraints comprise at least one of a fitting volume, an avoidance volume, a symmetry requirement, the designated interaction surface, a maximum total length of edge connections in the 3D structure, and a maximum mass of the 3D structure; and a genetic programming module at least one of controllable and executable by the one or more processors, and configured to generate the 3D structure through iterative application of genetic programming to the VRG system, wherein the iterative application of the genetic programming minimizes the objective function, wherein the genetic programming module is further configured to apply a mutation to the rule, and wherein generating the 3D structure includes applying the rule a number of times specified by the recursion limit parameter, each application of the rule resulting in an additional vertex being added to the 3D structure.

11. The system of claim 10, wherein the procedure generation module is further configured to initialize the rule with a randomized property parameter for at least one of the two vertices, the rule being initialized prior to a first iterative application of the genetic programming.

12. The system of claim 10, wherein
the rule further specifies a symmetry flag;
the rule further specifies a property parameter for at least one of the two vertices; and
the property parameter comprises at least one of (a) an active/inactive state flag of at least one of the two vertices, or (b) orthonormal vectors defining a coordinate system of at least one of the two vertices.

13. A non-transitory computer program product having instructions encoded thereon that when executed by one or more computer processors cause the one or more computer processors to perform a process comprising:
receiving one or more constraints relevant to a 3D structure to be generated, at least one of the one or more constraints derived from a designated interaction surface of a given 3D model; and
generating the 3D structure using the designated interaction surface of the given 3D model, through iterative application of genetic programming to a plurality of vertex-rule-graph (VRG) systems to evolve the VRG systems based on the one or more constraints;
wherein a particular one of the VRG systems provides a rule that specifies (i) an edge connection between two vertices of the 3D structure and (ii) a recursion limit parameter for the rule;
wherein, for a first application of the rule, a first one of the two vertices is an initial vertex associated with the designated interaction surface;
wherein a second one of the two vertices is created based on applying the rule provided by the particular VRG system; and wherein generating the 3D structure includes applying the rule a number of times specified by the recursion limit parameter, each application of the rule resulting in an additional vertex being added to the 3D structure; and
wherein the edge connection specifies a direction parameter and a distance parameter.

14. The non-transitory computer program product of claim 13, wherein generating the 3D structure further comprises:
applying the rule of the particular VRG system to the initial vertex to generate a 3D graph associated with the particular VRG system;
generating a skeleton geometry associated with the 3D graph;
calculating an objective function for the skeleton geometry, the objective function configured to evaluate fitness of the skeleton geometry based on at least some of the one or more constraints; and
generating the 3D structure through iterative application of the genetic programming to a selected subset of the plurality of VRG systems, wherein iterative application of the genetic programming minimizes the objective function.

15. The non-transitory computer program product of claim 13, wherein the genetic programming further comprises performing graph crossovers of the VRG systems.

16. The non-transitory computer program product of claim 13, wherein generating the 3D structure further comprises initializing the rule with a randomized property parameter for at least one of the two vertices, the rule being initialized prior to a first iterative application of the genetic programming.

17. The non-transitory computer program product of claim 13, wherein the rule further specifies a symmetry flag.

18. The non-transitory computer program product of claim 13, wherein
the rule further specifies a property parameter for at least one of the two vertices; and
the property parameter comprises at least one of (a) an active/inactive state flag of at least one of the two vertices, or (b) orthonormal vectors defining a coordinate system of at least one of the two vertices.

19. The non-transitory computer program product of claim 14, wherein generating the skeleton geometry further comprises replacing the edge connection with a cylinder and replacing at least one of the two vertices with a sphere.

20. The non-transitory computer program product of claim 13, wherein at least one of the one or more constraints specifies at least one of a fitting volume, an avoidance volume, a symmetry requirement, a maximum total length of edge connections in the 3D structure, and a maximum mass of the 3D structure.

* * * * *